(12) United States Patent
Hoeger et al.

(10) Patent No.: US 11,724,331 B2
(45) Date of Patent: Aug. 15, 2023

(54) SYSTEM AND METHOD FOR CONTROLLING SHIELDING GAS FLOW IN A WELDING DEVICE

(71) Applicant: Illinois Tool Works Inc., Glenview, IL (US)

(72) Inventors: Michael Hoeger, Appleton, WI (US); Zachary Erndt, Sherwood, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 426 days.

(21) Appl. No.: 16/748,301

(22) Filed: Jan. 21, 2020

(65) Prior Publication Data

US 2020/0156173 A1 May 21, 2020

Related U.S. Application Data

(63) Continuation of application No. 15/236,699, filed on Aug. 15, 2016, now Pat. No. 10,537,958.

(51) Int. Cl.
 *B23K 9/16* (2006.01)
 *B23K 9/095* (2006.01)
 *B23K 9/10* (2006.01)
 *B23K 9/32* (2006.01)

(52) U.S. Cl.
 CPC ............ *B23K 9/164* (2013.01); *B23K 9/0953* (2013.01); *B23K 9/0956* (2013.01); *B23K 9/1006* (2013.01); *B23K 9/1087* (2013.01); *B23K 9/16* (2013.01); *B23K 9/325* (2013.01)

(58) Field of Classification Search
 CPC ...... B23K 9/164; B23K 9/095; B23K 9/0953; B23K 9/0956; B23K 9/10; B23K 9/32; B23K 9/325; B23K 9/1006; B23K 9/1087
 See application file for complete search history.

(56) References Cited

U.S. PATENT DOCUMENTS

| 3,791,813 A | 2/1974 | Ramachandran |
| 4,749,841 A | 6/1988 | Galantino |
| 4,871,898 A | 10/1989 | Cherne |
| 5,291,423 A | 3/1994 | Roosli |

(Continued)

FOREIGN PATENT DOCUMENTS

| AU | 2018100195 | 3/2018 |
| CN | 1200060 | 11/1998 |

(Continued)

OTHER PUBLICATIONS

Environics, Series 3000 Gas Blending-Gas Delivery System, https://www.environics.com/products/gas-blending-gas-delivery-systems/, 5 pages, retreived Jan. 5, 2021.

(Continued)

*Primary Examiner* — Brian W Jennison
(74) *Attorney, Agent, or Firm* — McAndrews, Held & Malloy, Ltd.

(57) ABSTRACT

The present disclosure is directed to a system and method for obtaining a desirable shielding gas flow in a welding device. The system includes a user interface configured for a user to input the size of the nozzle, a processor that is configured to calculate a desirable flow rate of shielding gas based at least in part on the input nozzle size, and a flow regulator that is configured to control the flow of the shielding gas in order to obtain the desirable flow rate.

19 Claims, 2 Drawing Sheets

(56) References Cited

U.S. PATENT DOCUMENTS

| | | |
|---|---|---|
| 8,129,652 B2 | 3/2012 | Hampton |
| 8,754,348 B2 | 6/2014 | Salsich |
| 9,690,304 B2 | 6/2017 | Downie |
| 10,672,967 B2 | 6/2020 | Denis |
| 2007/0051703 A1 | 3/2007 | Neff |
| 2008/0053965 A1 | 3/2008 | Laymon |
| 2009/0152251 A1* | 6/2009 | Dantinne ............ B23K 9/0953 219/125.1 |
| 2011/0163072 A1* | 7/2011 | Vogel .................... B23K 9/095 219/130.33 |
| 2012/0248081 A1* | 10/2012 | Hutchison ........... B23K 9/0953 219/130.51 |
| 2013/0112660 A1* | 5/2013 | Enyedy ................ B23K 10/006 219/74 |
| 2014/0091066 A1* | 4/2014 | Enyedy ................ B23K 9/0956 219/74 |
| 2014/0374396 A1 | 12/2014 | Luo |
| 2015/0027998 A1 | 1/2015 | Brine et al. |
| 2016/0059341 A1 | 3/2016 | Peters |
| 2016/0136764 A1 | 5/2016 | Enyedy |
| 2016/0263691 A1 | 9/2016 | Smith |
| 2017/0216954 A1 | 8/2017 | Blankman |
| 2018/0290229 A1 | 10/2018 | Wada |

FOREIGN PATENT DOCUMENTS

| | | |
|---|---|---|
| CN | 101214584 | 7/2008 |
| EP | 0854006 | 7/1998 |
| JP | 01186281 | 7/1989 |
| JP | 2005177822 | 7/2005 |
| JP | 2019051546 | 4/2019 |
| WO | 2013051178 | 4/2013 |
| WO | 201504///0 | 4/2015 |

OTHER PUBLICATIONS

SuperFlash, Fully customize and mix your gases!, https://oxyfuelsafety.com/fully-customize-and-mix-your-gases, Mar. 18, 2015, 7 pages.

Binzel-Abicor, EWR 2 / EWR 2 Net Gas Monitoring System, retreived from https://www.binzel-abicor.com/US/eng/products/robotic-systems/gas-management-system-ewr-2-ewr-2-net/, retreived on Jan. 19, 2021, 13 pages.

Brooks Instruments, Mass Flow Controllers & Meters: Mass flow control technology. Unsurpassed process precision, retrieved from https://www.brooksinstrument.com/en/products/mass-flow-controllers, retrieved on Jan. 19, 2021, 6 pages.

Miller Electric Manufacturing Company, Spectrum 1250MG, Jun. 2000, 48 pages.

"Welding Handbook, Chapter 4—Gas Metal Arc Welding ED", O'Brien, Jan. 1, 2004, Welding Handbook Processes, vol. 2, Welding Processes, Part 1, American Welding Society, p. 178, right hand col. paragraphs 1-2.

International Search Report and Written Opinion for PCT/US2017/046700, dated Nov. 22, 2017, 20 pages.

European Patent Office, Extended European Search Report, Application No. 21159544.2, dated Aug. 16, 2021, 6 pages.

Extended European Search Report, appln No. 22151249.4, dated Jun. 20, 2022, 9 pages.

* cited by examiner

SYSTEM AND METHOD FOR CONTROLLING SHIELDING GAS FLOW IN A WELDING DEVICE

BACKGROUND

Shielding gas plays an important role in producing a quality weld. Specifically, the shielding gas prevents, or shields, the weld from atmospheric oxygen, which would cause oxidation, and other atmospheric contaminants. Accordingly, maintaining a desirable flow of shielding gas through a welding device is important to ensure that a quality weld can be produced. For example, it is desirable that the shielding gas exiting the nozzle of the welding device has a laminar, as opposed to turbulent, flow profile because a laminar flow profile introduces less undesirable reactive gases from the atmosphere into the inert gas column shielding the weld area.

It is also desirable that the shielding gas maintains a laminar flow profile even at a relatively significant distance from the nozzle orifice, i.e. that the shielding gas column has a relatively long laminar flow profile. This allows the welding device to be operated with the tungsten electrode extending (sticking out) further from the end of the nozzle to improve visibility and accessibility to the weld area, which allows for a user of the welding device to more effectively weld tighter or difficult to reach joints. For these reasons, higher quality and more easy to obtain welds may be achieved where the flow rate of shielding gas in a welding device is maintained at a level that provides a shielding gas column having a laminar flow profile.

Despite the importance of maintaining and setting proper shielding gas flow rates, conventional welding devices contain few shielding gas flow controls. Specifically, there is little guidance provided to a user regarding what flow rate to initially set for the shielding gas. Rather, the flow rate used during a weld is typically dependent on the user's particular experience and understanding of how to obtain a desirable shielding gas flow profile, and thus is subject to user error. Moreover, there is little control over the flow of the shielding gas once the initial flow rate is obtained.

Conventional weld devices often rely on a ball float valve, in which the height of a ball float serves to identify the flow rate of the shielding gas. However, these conventional arrangements suffer from a number of drawbacks, examples of which are described below. First, identifying the flow rate set point on ball float flow is often difficult. Various manufactures use different locations on the ball relative to the float tube scale to indicate flow rate. Measurements taken from the bottom, middle, and top of the ball are most common. Second, in order to set the flow rate of a ball float valve, gas must be flowing. This requires the user to turn on the gas flow while setting the flow rate. The user must initiate gas flow, typically from the welding power source or a valve on the welding torch, before adjusting the flow rate. This process is both cumbersome and wasteful.

Third, access can be limited or difficult by the fact that the ball float valve is typically located at the shielding gas manifold, which may be positioned a great distance away from the user and the weld area when the welding device is in use. Fourth, in large arrangements with numerous valves and poor hose management, identifying the correct ball float valve controlling the flow rate of a specific welding power source can be difficult. As a result, an operator could accidently adjust the gas flow rate for a welding power source other than intended. Fifth, a ball float does not maintain a constant flow rate with varying pressure upstream or varying head loss downstream of the ball float valve. In the case of a low shielding gas bottle or manifold pressure below the pressure regulated for the ball float, the flow rate will drop below the initial set point providing inadequate gas coverage and decreased weld quality.

Embodiments of the present disclosure provide a shielding gas flow control system that provides a user with greater control over the flow profile of the shielding gas in a welding device.

SUMMARY

Embodiments of the present disclosure are directed to a system for obtaining a desirable shielding gas flow in a welding device. The system includes a user interface configured for a user to input the size of a nozzle that is attached to the welding device. The system also includes a processor that is configured to calculate a desirable flow rate of shielding gas based at least in part on the input nozzle size. The system also includes a flow regulator that is configured to control the flow of the shielding gas in order to obtain the desirable flow rate.

In embodiments of the presently disclosed system, the system may be programmed to calculate a desirable flow rate of the shielding gas the system may be configured to calculate a desirable flow rate of the shielding gas using equation (1):

$$Q = \frac{\pi Re \mu D_H}{4\rho} \qquad (1)$$

in which Q is the volumetric flow rate of the shielding gas; Re is the Reynolds number that has been determined to provide for a desirable shielding gas flow profile; μ is the dynamic viscosity of the shielding gas; ρ is the density of the shielding gas; and $D_H$ is the hydraulic diameter of the nozzle, which for a conventional nozzle having a circular cross-section is simply the inside diameter of the nozzle. The value of Re may either be preset or determined by the processor in response to user input. Similarly, the values of μ and ρ may either be preset or determined by the processor in response to user input. The value $D_H$ is determined by the processor in response to the user input nozzle size.

In embodiments of the presently disclosed system, the user interface may be configured to display the flow rate of the shielding gas and/or to allow a user to manually adjust the flow rate of the shielding gas during operation. For instance, after the system initially determines a desirable shielding gas flow rate, the system may be configured to allow for the user to manually adjust the flow rate away from that initial value. This allows a user of a welding device to easily adjust the flow rate of the shielding gas as may be desired when switching between weld areas, in response to changed environmental conditions, and the like. In some embodiments, a range of suitable flow rates may be calculated by the processor or input through the user interface, and the system may be configured so that the user may only adjust the flow rate of the shielding gas within the range of suitable flow rates. This may prevent a user of a welding device from accidentally or mistakenly adjusting the flow rate of the shielding gas to a value that would be undesirable (e.g. inadequate gas coverage or excessive wasteful gas flow). In some embodiments, for example, the system may be configured to prevent and/or notify a user, such as through the user interface, if the user attempts to manually adjust the flow rate of the shielding gas outside the range of suitable flow rates.

In embodiments of the presently disclosed system, the flow regulator may be capable of adjusting to pressure fluctuations in order to substantially maintain the desirable shielding gas flow rate. In this way the desirable flow rate of shielding gas, and hence a shielding gas column having a desirable profile, may be maintained without the need for adjustments by the user.

Additional embodiments are directed to a welding device that includes the system of any of the embodiments of the present disclosure.

Additional embodiments are directed to a method for obtaining a desirable shielding gas column in a welding device, such as by using the system of any of the embodiments of the present disclosure. The method preferably includes at least the following steps: a. prompting a user to input a size of a nozzle that is attached to the welding device; b. determining a desirable flow rate for the shielding gas based, at least in part, on the input nozzle size; and c. controlling the flow of the shielding gas to obtain the desirable shielding gas flow rate. Embodiments of the method may also include the following step: adjusting the flow of the shielding gas in response to pressure fluctuations in order to substantially maintain the desirable shielding gas flow rate.

In some embodiments, a desirable flow rate for the shielding gas may be determined using equation (1):

$$Q = \frac{\pi Re \mu D_H}{4\rho} \tag{1}$$

in which Q is the volumetric flow rate of the shielding gas; Re is the Reynolds number that has been determined to provide for a desirable shielding gas flow profile; $\mu$ is the dynamic viscosity of the shielding gas; $\rho$ is the density of the shielding gas; and $D_H$ is the hydraulic diameter of the nozzle, which for a conventional nozzle having a circular cross-section is simply the inside diameter of the nozzle. The value of Re may either be preset or determined by the processor in response to user input. Similarly, the values of $\mu$ and $\rho$ may either be preset or determined by the processor in response to user input. The value $D_H$ is determined by the processor in response to the user input nozzle size.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

A clear conception of the advantages and features of one or more embodiments will become more readily apparent by reference to the exemplary, and therefore non-limiting, embodiments illustrated in the drawings.

DETAILED DESCRIPTION

Figure 1:
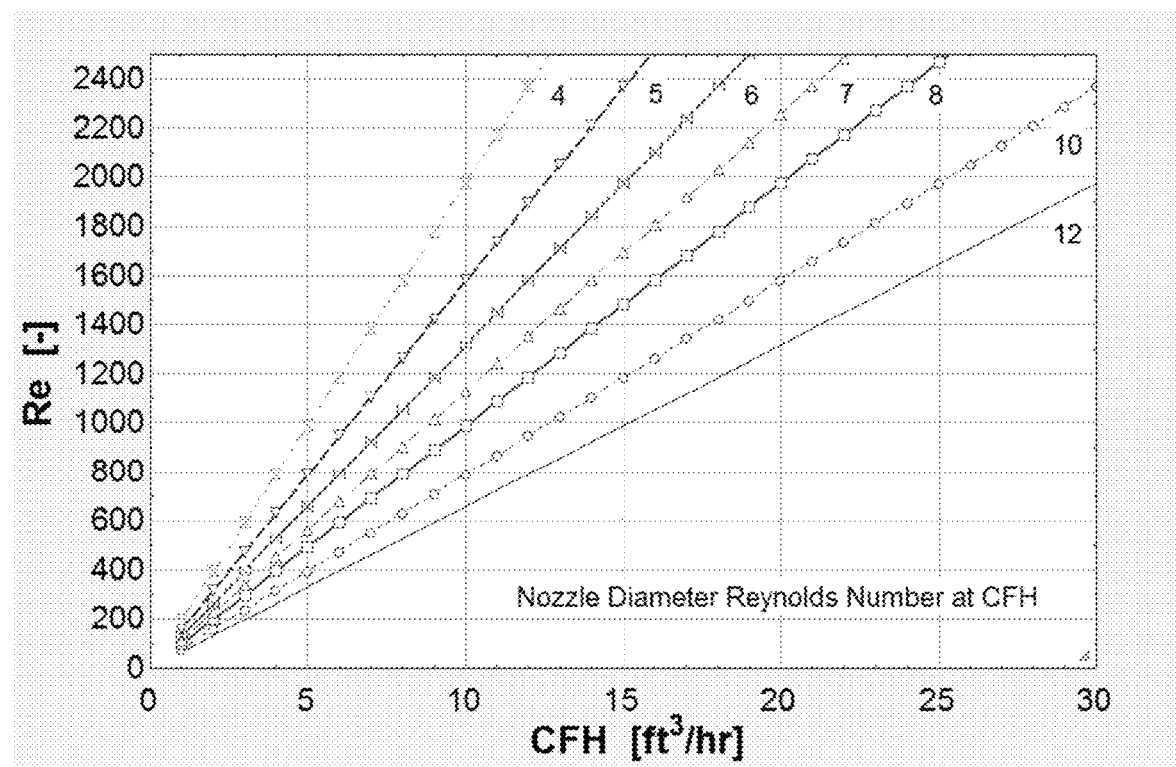
FIG. 1 is a graphical representation of the relationship between shielding gas flow rate and Reynolds number for a variety of nozzle sizes.

Reference will now be made in detail to certain embodiment(s), examples of which are illustrated in the accompanying drawings. Whenever possible, the same reference numerals will be used throughout the drawings to refer to the same or like parts.

Embodiments of the present disclosure are directed to a system for obtaining a desirable shielding gas flow in a welding device. The system preferably includes a user interface configured for a user to input the size of a gas nozzle that is attached to the welding device, a processor that is configured to calculate a desirable flow rate of shielding gas based at least in part on the input gas nozzle size, and a flow regulator that is configured to control the flow of the shielding gas in order to obtain the desirable flow rate.

A welding device refers to any device that is configured to perform a welding operation. Welding operation, as used herein, includes those that result in joining, such as welding or brazing of two or more physical objects, overlaying, texturing, heat-treating of a physical object, and/or a cut of a physical object). Common welding devices include devices, also often referred to as torches, used to perform gas tungsten arc welding (GTAW) or gas metal arc welding (GMAW).

Welding devices such as those listed above apply a column of shielding gas to the weld area in order to protect the molten weld pool from the atmosphere. Without this protection, the molten metal reacts with the gases in the atmosphere and produces discontinuities and defects in the weld. The weld deposits may even have undesired mechanical properties that greatly reduce weld strength. The shielding gas is generally provided as a compressed gas cylinder, which is then connected to the welding device. Shielding gases are generally inert gases, with the most commonly used shielding gases being helium, argon, or a mixture of helium and argon. In some applications, the inert gas or gases may also contain a small percentage of another gas, such as hydrogen, nitrogen, oxygen, or carbon dioxide. For example, in some applications, the shielding gas may be a mixture of about 85-95% argon and 5-15% hydrogen, a mixture of about 95-99% argon and 1-5% nitrogen, a mixture of about 95-99% argon and 1-5% oxygen, or a mixture of about 75-90% argon and 10-25% carbon dioxide.

A gas nozzle for a welding device, also often referred to simply as a nozzle or a cup, is a component through which the shielding gas flows from a proximal end, which is attached to the head of the welding device, to a distal end. The distal end comprises an outlet through which the shielding gas exits the welding device and is directed toward the weld area in what is known as a shielding gas column. Nozzles may have any number of different shapes, diameters, and lengths. Nozzles may be made of any type of heat resistant materials, including but not limited to ceramics, metals (e.g. copper, brass, etc.), metal-jacketed ceramic, glass, and the like. Many welding devices, such as gas tungsten arc welding devices, utilize replaceable ceramic nozzles that are either screwed into the torch head or pushed into place on the torch head.

Each nozzle is typically printed with a number. This number, also known as the nozzle size or cup size, identifies the inner diameter of the nozzle. Conventionally, for example, a number x printed on a nozzle indicates that the nozzle has an inner diameter that is x/16 of an inch. Accordingly, a nozzle having a cup size of 4 indicates a nozzle having an inner diameter of 4/16 of an inch or ¼ inch; a nozzle having a cup size of 8 indicates a nozzle having an inner diameter of 8/16 of an inch or ½ inch; and the like. The size, e.g. inner diameter, of a gas nozzle should be large enough to provide adequate shielding gas coverage to the weld area. A user of a welding device will typically select a nozzle size that he or she feels is best suited to a particular welding application.

As described above, the selection of a desirable flow rate for the shielding gas is of particular importance. However, desirable shielding gas flow rates will differ depending on any number of variables. For instance, when the welding current is increased, the shielding gas flow rate should generally be increased in order to account for the action of convective forces which can disrupt or collapse the shielding gas column. Environmental conditions also play a major role in shielding gas flow rate. For example currents of air in the vicinity of the welding operation will often require an increase in shielding gas flow rate in order to account for the physical disruption of the shielding gas column that can be caused by such air currents. These air currents may be caused by nature, such as may occur on naturally windy days or drafty locations, or may be caused by nearby mechanical systems such as ventilation systems and the like. The selection of a desirable shielding gas flow rate also depends on the size of the nozzle being used. Because, the selection of a desirable shielding gas flow rate is dependent on so many factors, the shielding gas flow rate selected by a user for a particular welding application is not always optimal. Moreover, because the flow regulator for the shielding gas is typically located at the shielding gas manifold, which is generally positioned a great distance away from the user and the weld area when the welding device is in operation, it is often difficult or impossible for a user to adjust the shielding gas flow while performing a welding operation.

Embodiments of the present disclosure are directed to a system that automatically selects a shielding gas flow rate based at least in part on the effective distal orifice diameter of the nozzle (generally referred to as the size of the nozzle or the cup size) that is attached to the welding device. Accordingly, the system may include at least a user interface configured for a user to input the size of the nozzle, a processor configured to calculate a desirable shielding gas flow rate based at least in part on the input nozzle size, and a flow regulator configured to control the flow of the shielding gas so as to obtain the calculated desirable flow rate. Embodiments of the present disclosure are also directed to a system that makes it easy for a user to adjust the flow rate of the shielding gas flow at the point of operation. In some embodiments, for instance, the system may be configured so that a user may adjust the shielding gas flow rate away from the rate that is automatically selected based on a user input nozzle size.

Figure 2:
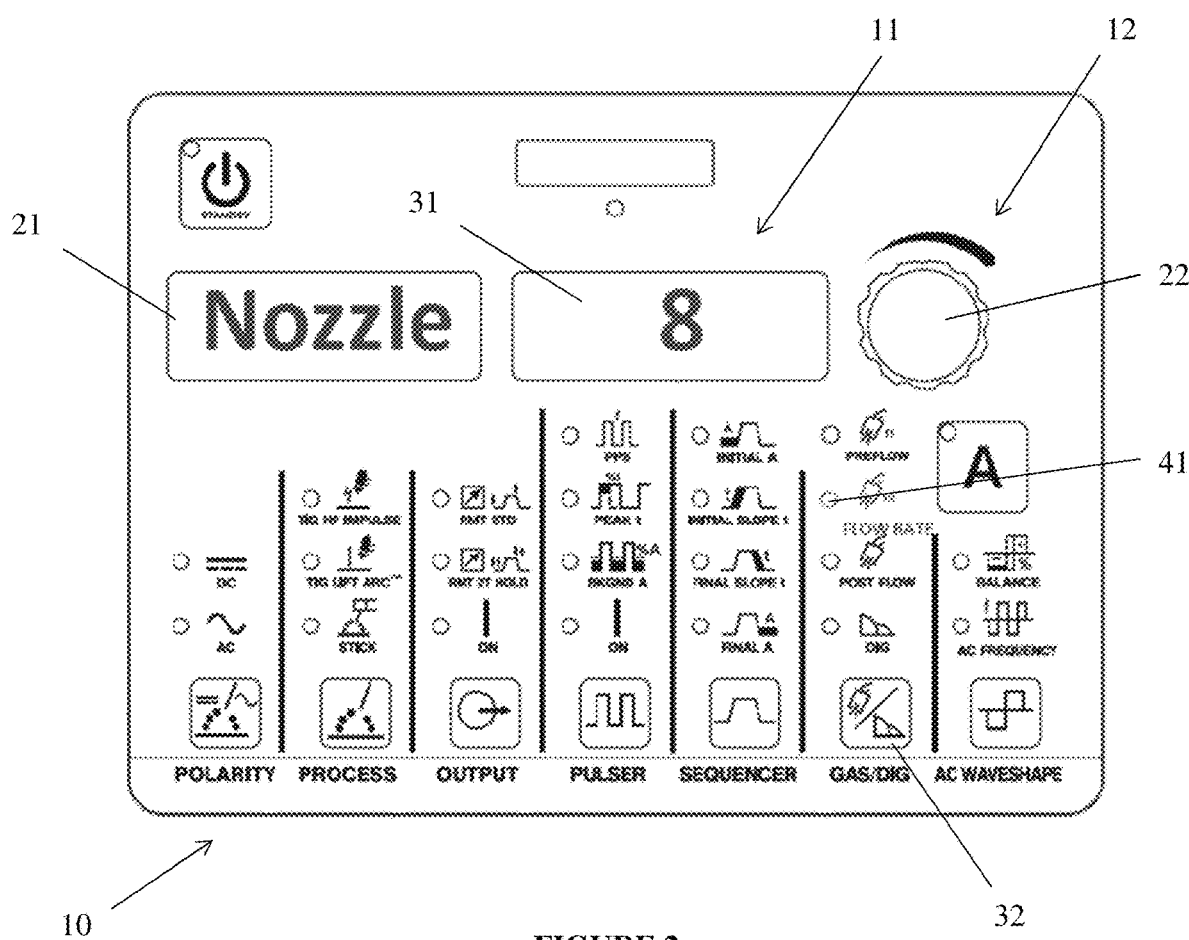
FIG. 2 is an illustration of a user interface according to an embodiment of the present disclosure.

An embodiment of a user interface 10 that may be utilized in the presently disclosed system is shown in FIG. 2. The user interface 10 preferably comprises one or more display components 11 and one or more user input components 12. The display component may be any device capable of communicating visual information to a user. For example, a display may include a liquid crystal display, a light emitting diode display, and/or any other suitable display. The display can be operable to display information from a software application, such as a welding parameter control application. In various embodiments, the display may also be operable to display information provided by the processing unit. The display component 11 shown in the embodiment of the user interface illustrated in FIG. 2 comprises a pair of screens 21, 31. As would be apparent to a person of skill in the art, the number of display components on the user interface, as well as the size, shape, and location of each display component could be selected without departing from the scope of the present disclosure.

The user input component 11 may include any device or devices capable of communicating information from a user and/or at the direction of the user to the processor. The user input component 12 may include one or more buttons, knobs, levers, joysticks, scroll wheels, touchscreens, near field communication (NFC) readers, radio frequency identification (RFID) readers, voice recognition, keyboards, cameras, and/or any other device capable of receiving a user directive. The user input component 12 shown in the embodiment of the user interface illustrated in FIG. 2 comprises a knob 22 that is configured to rotate both clockwise and counterclockwise as well as a number of buttons 32. As would be apparent to a person of skill in the art, the number of user input components, as well as the size, shape, and location of each user input component could be selected without departing from the scope of the present disclosure.

Although the user interface 10 shown in FIG. 2 comprises separate display 11 and user input components 12, the display and the user input components may also be integrated as a touchscreen display. Moreover, as shown in the embodiment of FIG. 2, the user interface 10 may be configured so that a user may control and/or adjust one or more other parameters related to the welding device. For instance, in some embodiments, an existing welding device controller may be modified in order to operate as described herein. In other non-illustrated embodiments, the user interface may be a stand-alone unit that is configured solely to control the shielding gas flow.

The processor may comprise one or more central processing units, microprocessors, microcontrollers, and/or the like. The processing unit may be an integrated component, or may be distributed across various locations, for example. The processing unit may be capable of executing a software application, receiving input information from a user input device and/or communication connection(s), and generating an output displayable by a display, among other things. The processing unit may be capable of executing any of the method(s) and/or set(s) of instructions described and/or illustrated herein in accordance with the present disclosure, for example.

In some embodiments, the processor may also comprise a memory. The memory may be one or more computer-readable memories, for example compact storage, flash memory, random access memory, read-only memory, electrically erasable and programmable read-only memory and/or any suitable memory. The memory may include databases, libraries, sets of information, or other storage accessed by and/or incorporated with the processor, for example. The memory may be able to store data temporarily or permanently, for example. The memory may be capable of storing data generated by the processor and/or instructions readable by the processor, among other things. In various embodiments, the memory stores information related to the flow rate of shielding gas used during a welding operation, for example.

In various embodiments, the information provided by the user input components to the processing unit may be processed by the processing unit to execute a shielding gas flow control application, for example. As an example, button depressions, knob or wheel rotations, touchscreen selections, NFC tag information, RFID tag information, and/or voice commands, among other things, may be received from the user input component and processed by the processor to trigger a shielding gas flow control application action or set of actions. In certain embodiments, the processing unit may then communicate the output of the shielding gas flow control application via communication connection(s) with a flow regulator, which controls the flow of shielding gas, to obtain a desirable shielding gas flow rate.

In various embodiments, the system may correspond with one or more computing and user communication devices, among other things. Components of the system may be implemented separately and/or integrated in various forms. In various embodiments, the computing system may be a mobile device, for example. Components of the system may be implemented in existing software, hardware, firmware, and/or the like. The various components of the system may be communicatively linked.

The system is configured to accept user input, including user input identifying the nozzle size being utilized with a welding device, and communicate the use input data to the processor. In some embodiments, for example, the user interface may prompt the user to enter the size of the nozzle.

In the embodiment shown in FIG. 2, for example, a user may select shielding gas flow rate from among the various welding parameter options using one or more of the user input components. For instance, by pushing button 32 (labeled "GAS/DIG") a desired number of times, a user may cycle through the various parameters within that category to select a particular parameter. Display lights 41 located next to each parameter are configured to illuminate when the corresponding parameter is selected. Accordingly, a user may select to control the flow rate of the shielding gas by pressing the associated button 32 until the display light 41 next to "Flow Rate" is illuminated. In embodiments in which the user interface is designed solely for control over the flow of shielding gas, this selection step may be absent.

Once control of the shielding gas flow rate has been selected by a user, the user may be prompted, such as by the display component, to enter a nozzle size. For instance, in the embodiment shown in FIG. 2, the display component 11 identifies the information that is sought to be input through display of the word "Nozzle" (see screen 21) and a number that corresponds to a particular nozzle size (see screen 31). Using one or more of the user input components 12, a user may then select a particular nozzle size. For instance, by turning the knob 22, a user may cycle through a series of nozzle sizes until the proper size is displayed on screen 31. After a predetermined period of time without any further input from the user (e.g. further turning of knob 22), the nozzle size displayed on screen 31 will be considered selected.

In alternative embodiments, the user interface may be configured for a user to select the nozzle size by pressing one or more buttons, rotating one or more scroll wheels, pressing identified locations of a touchscreen, speaking the size into an integrated microphone, or the like. Alternatively, the user interface may be configured to prompt a user to scan a nozzle in such a way that the nozzle size can be identified. Alternatively, the user interface may be configured for a user to select the nozzle size by identifying the size of a nozzle having an identifying tag, e.g. a near field communication (NFC) or radio frequency identification (RFID) tag, such as through the use of a tag reader, e.g. a near field communication reader, a radio frequency identification reader, or the like.

Embodiments of the presently disclosed system are also configured to communicate the input nozzle size information to the processor. For instance, the processor may be configured to communicate with the user interface in order to accept user input, including for example a user's selection of the nozzle size being utilized with the welding device.

The processor may be configured to calculate a desirable flow rate of shielding gas based at least in part on the input nozzle size. In some embodiments, the calculation of a desirable shielding gas flow rate may be based on the discovery that the selection of a particular nozzle has a significant effect on which gas flow rates produce a desirable laminar flow shielding column. This relationship may be characterized through the relationship between nozzle diameter, shielding gas flow rate, and Reynolds number. This relationship is graphically illustrated in FIG. 1. Each plot of FIG. 1 shows the Reynolds number of a flow of an argon shielding gas through a particular nozzle diameter at a variety of flow rates (the flow rates being measured in cubic feet per hour). Each plot is labeled with the cup size of the nozzle, which for exemplary purposes range between 4 (i.e. a nozzle having a ¼ inch inner diameter) and 12 (i.e. a nozzle having a ¾ inch inner diameter).

In embodiments of the presently disclosed system, the system may be programmed to calculate a desirable flow rate of the shielding gas based on a Reynolds number that provides a desirable shielding gas flow profile. Although lower Reynolds numbers are known to correspond to more laminar flow profiles, the selection of the lowest possible Reynolds number is not desirable, as the shielding gas will often not adequately perform its intended function at lower Reynolds numbers. For instance, the momentum of the gas flow profile may be insufficient to maintain a stable column in the presence of perturbations from the atmosphere or convection created by the welding arc heat. Rather, the inventors have determined that a Reynolds number between about 1200 and 2200 will generally be desirable for most welding conditions. In some embodiments, for instance, the desirable Reynolds number may be between 1200 and 2200, alternatively between 1400 and 2200, alternatively between 1600 and 2200, alternatively between 1800 and 2200, alternatively between 1400 and 2000, alternatively between 1400 and 1800, alternatively between 1600 and 2200, alternatively between 1600 and 2000, alternatively between 1800 and 2200, alternatively between 1200 and 1400, alternatively between 1600 and 1800, alternatively between 1800 and 2000, alternatively between 2000-2200.

For example, in embodiments of the presently disclosed system, the system may be configured to calculate a desirable flow rate of the shielding gas using equation (1):

$$Q = \frac{\pi Re \mu D_H}{4\rho} \quad (1)$$

in which Q is the volumetric flow rate of the shielding gas; Re is the Reynolds number that has been determined to provide for a desirable shielding gas flow profile; $\mu$ is the dynamic viscosity of the shielding gas; $\rho$ is the density of the shielding gas; and $D_H$ is the hydraulic diameter of the nozzle, which for a conventional nozzle having a circular cross-section is simply the inside diameter of the nozzle.

It should be understood that calculating a desirable flow gas using equation (1) is also meant to encompass the use of any variations of the above equation. For instance, μ/ρ may be replaced by the kinematic viscosity of the shielding gas, which is also a material property of the gas. Other variations which would also be understood to be possible by persons of skill in the art are similarly contemplated as being a use of equation (1). For example, variations of equation (1) may be derived using the following underlying equations, which also form the basis for equation (1):

$$Re = \frac{\rho v D_H}{\mu} \quad \text{Reynolds Number Equation,}$$

$$v = \frac{\mu Re}{\rho D_H} \quad \begin{array}{l}\text{Reynolds Number Equation}\\\text{Rearranged Solving for Velocity,}\end{array}$$

$$A = \pi D_H^2 \quad \text{Nozzle Orifice Area for circular nozzle, and}$$

$$Q = vA \quad \text{Volumetric Flow Rate equation,}$$

wherein Re is the Reynolds Number, ρ is the Shielding Gas Density, μ is the Shielding Gas Dynamic Viscosity, v is the Shielding Gas Velocity, $D_H$ is the Nozzle Hydraulic Diameter, A is the Nozzle Orifice Area, π is Pi, and Q is the Shielding Gas Volumetric Flow Rate.

The value of Re may either be preset or determined by the processor in response to user input. In some embodiments, a Reynolds number that will generally be desirable under most standard welding conditions may be preset and used to calculate a flow rate of the shielding gas, for example through use of the above-identified equation.

In some embodiments, the user interface may be configured for a user to identify one or more conditions and/or parameters that would affect what Reynolds number would be most desirable. For instance an additional function of the user interface may be to allow a user to select one or more of a variety of conditions and/or parameters, such as the amount of air current in the vicinity of the welding operation (e.g. wind conditions), the intended travel speed of the welding device, the amperage setting of the welding power source, etc. As an example, a user may be prompted to select an air current (e.g. wind) value from within a number scale, e.g. a scale of 1-5, 1-10, or the like so that turbulence caused by environmental air currents may be taken into account. As another example, a user may be prompted to indicate whether the welding operation is to be performed using a high travel speed, such as may be indicated by a simple "yes" or "no" response and/or by the input of the intended travel speed, so that turbulence caused by the movement of the welding device may be taken into account. As another example, a user may be prompted to enter the amperage setting of the welding power source so the degree of convection turbulence caused by the heat of the arc could be taken into account.

The processor may be configured to utilize the input conditions and/or parameters in order to more particularly determine a desirable Reynolds number that is tailored for a specific welding application. For instance, the processor may be configured to match the user input with one or more values or algorithms that are stored in an associated memory in order to calculate a more tailored Reynolds number for the specific application. For example, the selection of a higher air current value may indicate that a flow having a higher Reynolds number is desirable in order to prevent gusts of wind, for example, from collapsing a column of low Reynolds number laminar flow. On the other hand, the selection of a lower air current value may indicate that a flow having a lower Reynolds number could be used (i.e. that the higher Reynolds number would not be needed to protect against gusty conditions). Similarly, the presence of a relatively high heat arc could indicate that flow having a higher Reynolds number may be useful in order to prevent convection turbulence from collapsing a column of low Reynolds number laminar flow. On the other hand, the presence of a relatively low heat arc could indicate that a flow having a lower Reynolds number could be used (i.e. that the higher Reynolds number would not be needed to protect against convention turbulence).

In some embodiments, a particular Reynolds number corresponding with a generally desirable shielding gas flow may be preset and used by the processor to calculate the flow rate unless a user chooses to identify one or more of the above variables through the user interface. In this way, a generally desirable Reynolds number will serve as a default and a user will have an option to input additional information, e.g. one or more of the conditions and/or parameters described above. If the user chooses to input additional information, that information will be communicated to the processor and relied on to calculate a more tailored Reynolds number. This allows a user to adjust the preset value to account for non-standard welding conditions, such as high air currents, high travel speed, or the like.

The values of μ and ρ (or the kinematic viscosity, i.e. μ/ρ) may either be preset or determined by the processor in response to user input. In embodiments of the presently disclosed system, the values of μ and ρ (or the kinematic viscosity, i.e. μ/ρ) of the gas, may be preset. This may be especially desirable where a single type of shielding gas is typically used with the welding device.

In embodiments of the presently disclosed system, the user interface may also be configured for a user to identify the type of shielding gas being used. For instance, in addition to prompting a user to input the size of the nozzle, the user interface may prompt a user to identify the type of shielding gas being used. For instance, in some embodiments, the user interface may prompt a user to select the shielding gas from a number of commonly used options, which the user may be able to cycle through. The embodiment of the user interface 10 shown in FIG. 2, for example, may be configured to display the name of a common shielding gas on a display component, e.g. at either one of screens 21 and 31. The user may cycle through a number of stored names of common shielding gas using an input component, e.g. by turning knob 22. Once an identity of a shielding gas has been input by a user, the processor may be configured to determine the proper values for μ and ρ (or the kinematic viscosity, i.e. μ/ρ) of the selected shielding gas. This may be done for example by selecting a value that corresponds to the input shielding gas from an associated memory.

In some embodiments, the values of μ and ρ (or the kinematic viscosity, i.e. μ/ρ) may be preset to correspond with a specific shielding gas unless a user chooses to change the identity of the shielding gas using the user interface. For example, an advanced function of the user interface may be to allow a user to select when to change the preset shielding gas. In this way, a specific shielding gas will serve as a default and a user will have an option to change the identity of the shielding gas. If the user chooses to input a new shielding gas, that information will be communicated to the processor and relied on in a shielding gas flow rate calculation.

The value of $D_H$ (and/or A) may be determined by the processor based on to the user input nozzle size. Because $D_H$ is the hydraulic diameter of the nozzle, the value of $D_H$ for a conventional nozzle having a circular cross-section is equivalent to the inside diameter of the nozzle, which is identified by the input nozzle size. Similarly, because A is the cross-sectional area of the nozzle, it can be easily calculated using the input nozzle size, which, as explained above, corresponds to a particular inner diameter. Using the input nozzle size, the values of $D_H$ (and/or A) may be easily calculated by the processor or selected from an associated memory component. In some alternative embodiments, a user may be prompted to enter the inside diameter of the nozzle or the cross-sectional area of the nozzle as opposed to the nozzle size.

Embodiments of the presently disclosed system are also configured to communicate the calculated desirable flow rate to a flow regulator. For instance, the flow regulator may be configured to communicate with the processor in order to accept the calculated flow rate. The flow regulator is configured to control the flow of the shielding gas in order to provide shielding gas to the welding device at the calculated desirable flow rate. In some embodiments, the flow regulator may also be capable of adjusting to pressure fluctuations in order to substantially maintain the desirable shielding gas flow rate. In this way the desirable flow rate of shielding gas, and hence a shielding gas column having a desirable profile, may be maintained without the need for adjustments by the user. For example, in some embodiments, the flow regulator may comprise a proportional control valve, a servo valve, or the like.

The precision to which the flow rate of the shielding gas flow is controlled by the flow regulator may vary. In some embodiments, for example, where the gas flow is measured in cubic feet per hour, the flow regulator may be configured to control the flow rate to the calculated whole unit (zero decimal places), tenth of a unit (one decimal place), hundredth of a unit (two decimal places), thousandth of a unit (three decimal places), or greater. Control over the flow rate to the hundredth of a unit or greater may be especially desirable where low nozzle sizes are utilized, as the character of the shielding gas from a small-diameter nozzle is sensitive to flow rate variations, as demonstrated for example by FIG. 1.

The user interface may also be configured to display the flow rate of the shielding gas. For example, the processor may also communicate the calculated desirable flow rate to the user interface, whereupon it may be displayed on the one or more display components and monitored by a user. In embodiments utilizing the user interface shown in FIG. 2, a user may choose to view the shielding gas flow rate by using an input component 12, e.g. by pressing button 32 until flow rate is selected. Once flow rate is selected, a display component 11, e.g. one or more of screens 21, 31 will display the shielding gas flow rate. For instance, the first screen 21 might show the numerical value of the flow rate and the second screen 31 might show the units of measurement, e.g. CFH (cubic feet per hour), LPS (liters per second), or the like. The numerical value of the flow rate may be displayed to the same level of precision at which the flow regulator controls the gas, for instance to the whole unit (zero decimal places), the tenth of a unit (one decimal place), the hundredth of a unit (two decimal places), or the thousandth of a unit (three decimal places). In some embodiments, the user interface may also be configured so that a user is able to change the units of measurement in which the gas flow rate is displayed. For example, the processor could be configured to convert the gas flow rate to a number of different units and a user could cycle through the various flowrates using the one or more input components. This may prevent or at least reduce user-based unit conversion errors.

In some embodiments, the system may also be configured so that a user may manually adjust the flow rate of the shielding gas during the welding operation. For example, a user may adjust the flow rate of the shielding gas upwards or downward from the initially calculated rate using the one or more user input components. In embodiments utilizing the user interface shown in FIG. 2, for example, a user may turn knob 22 in a clockwise direction to increase the shielding gas flow rate and in a clockwise direction to decrease the shielding gas flow rate.

In some embodiments, a range of suitable flow rates may be calculated by the processor or input through the user interface. For example, in addition to calculating a desirable flow rate at which to initially set the flow of shielding gas (through communication with the flow regulator), the processor may also calculate a range of suitable flow rates. Alternatively, a range of suitable flow rates may be input, such as by a supervisor or project manager, through the user interface.

The system may be configured to notify the user if the shielding gas flow rate fluctuates outside of the range. In some embodiments, for example, the user interface may be configured to notify a user if the flow rate of the shielding gas deviates outside the range of suitable flow rates. This may serve to indicate that some event has occurred during operation of the welding device that has caused the flow rate of the shielding gas to deviate from the range of suitable flow rates. For example, the shielding gas canister may be low or empty or a gas line may become crimped, kinked, or punctured, any of which might cause the gas flow rate to drop below the suitable range. The notification may be by a visual indicator on the display, such a light or a graphical display that shows deviation from a target range, an audible signal, or a combination thereof.

In some embodiments, a user may adjust the flow rate of the shielding gas and the system may be configured to notify a user if he or she manually adjusts the shielding gas flow rate outside of the range of suitable flow rates. In some embodiments, for example, the user interface may be configured to notify a user by an indication on the display, an audible signal, or a combination thereof, if the user manually adjusts the flow rate of the shielding gas outside the range of suitable flow rates. Alternatively, the system may restrict how far from the calculated desirable flow rate a user may adjust the shielding gas flow rate. In some embodiments, for example, the user interface is configured to only allow for manual adjustment of the flow rate of the shielding gas within the range of suitable flow rates.

In some embodiments, the breadth of the range of suitable flowrates may be preset, such as by a supervisor or other authorized person. Similarly, the breadth of the range may be altered depending on the experience level of the particular operator of the welding device. For example, the range of suitable flowrates may be set to be relatively large where the operator is an experienced welder and the range of suitable flowrates may be set to be relatively small where the operator is inexperienced. In some embodiments, a supervisor or other authorized person may even configure the system so that an operator may not manually adjust the shielding gas flow rate. In this way, embodiments of the present system may operate as a training tool and/or a guard against human error associated with the selection of a poor shielding gas flow rate.

In some embodiments, the system may be configured to record the flow rate of the shielding gas during operation of the welding device. For instance, the initial calculated flow rate as well as any manual adjustments that were made to the initial flow rate during a welding application may be recorded in the memory associated with the processor. In some embodiments, the shielding gas flow rates may be recorded with a timestamp so that a profile of the shielding gas flow rate over the length of a welding application may be retrieved and reviewed. Accordingly, the system may allow a supervisor or other authorized person to review the adjustments to the shielding gas flow rate made during a welding application. In this way, embodiments of the present system may operate as a training tool and/or a guard against human error associated with the selection of a poor shielding gas flow rate.

In some embodiments, the system may be configured to provide for a purge flow of shielding gas having a desirable low flow rate. During a welding operation, a continuous flow of shielding gas may be maintained when the arc is idle in order to prevent the atmosphere from diffusing into the welding device. This is known as purge gas flow. In embodiments of the present disclosure, the system may be configured to automatically adjust the purge gas flow of the shielding gas to a desirably low flow rate when the arc becomes idle. For example, the desirable purge gas flow rate may be preset at a rate that is less than 1 CFH. Alternatively, the user interface may be configured so that a user can select a low purge gas flow rate, such as from a variety of low flow rate options. These flow rates may be significantly lower than the flow rates used in conventional continuous purge gas operations. In this way, shielding gas may be conserved.

For instance, the processor may be equipped with or configured to communicate with one or more sensors, controllers, or the like, which indicate whether the arc is turned on or off. When the processor registers that the arc becomes idle, the processor may communicate a desirable purge gas flow rate to the flow regulator. The flow regulator may then control the shielding gas flow so as to obtain the desirable purge gas flow rate. Similarly, when the processor registers that the arc is back in operation, the processor may communicate the desirable operating shielding gas flow rate to the flow regulator, which may control the shielding gas flow so as to provide the desirable shielding gas flow rate. In other embodiments, the system may be configured so that the user, for instance through the user interface, may select a continuous purge operating mode.

Shielding gas may also be conserved by embodiments of the present disclosure because the system may be configured so that the flow rate of the shielding gas could be set prior to initiating the flow of gas. Using conventional methods, the flow of shielding gas must be initiated in order for a user to determine the flow rate and select a particular flow rate to use during a weld application. Using embodiments of the present system, a user may input at least the nozzle size information and the processor may determine the desirable flow rate prior to the initiation of the gas flow, thereby conserving shielding gas.

In embodiments of the presently disclosed system, the user interface may be positioned in a location that provides convenient access to a user of the welding device during a welding application. For example, the user interface may be incorporated onto a power source of the welding device. Alternatively, the user interface may be attachable and detachable from a power source of the welding device. In some embodiments, the user interface may also be capable of being worn and/or carried by a user of the welding device. By positioning the user interface at the point of use, embodiments of the system provide an improved degree of control over the shielding gas during the welding operation.

Moreover, in some embodiments, the user interface may be configured to allow a user of the welding device to select or adjust a number of other parameters, including for example those shown in FIG. 2. Alternatively, the user interface may be a standalone unit.

Other aspects of the present disclosure are directed to a welding device comprising any of the embodiments of the above-described system and a method of obtaining and/or maintaining a desirable shielding gas column in a welding device, such as through the use of any of the embodiments of the above-described system. For example, one aspect of the presently disclosed disclosure is a method for obtaining a desirable shielding gas column in a welding device comprising: a. prompting a user to input a size of a nozzle that is attached to the welding device; b. determining a desirable flow rate for the shielding gas based, at least in part, on the input nozzle size; c. controlling the flow of the shielding gas to obtain the desirable shielding gas flow rate; and optionally d. adjusting the flow of the shielding gas in response to pressure fluctuations in order to substantially maintain the desirable shielding gas flow rate.

It can be seen that the described embodiments provide a unique and novel system and method that has a number of advantages over those in the art. While there is shown and described herein certain specific structures embodying the disclosure, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A system for obtaining a desirable flow of shielding gas in a welding device, the system comprising:
   a user interface having a plurality of welding parameter options, the user interface configured to receive an input from a user;
   a processor configured to determine a desirable flow rate of the shielding gas based at least in part on the input; and
   a flow regulator configured to control a flow of the shielding gas in order to obtain the desirable flow rate,
   wherein the user interface is configured to display a first rate of the flow of the shielding gas with a first unit of measurement, and display a second rate of the flow of the shielding gas with a second unit of measurement that is different than the first unit of measurement, the first rate being equivalent to the second rate.

2. The system of claim 1, wherein the input comprises a manually entered flow rate, the user interface is configured to require the manually entered flow rate to be within a range of suitable flow rates, and the range of suitable flow rates is either determined by the processor or received through the user interface.

3. The system of claim 2, wherein the processor is configured to determine the range of suitable flow rates based on an experience level of the user.

4. The system of claim 2, wherein the user interface is configured to output a notification if a rate of the flow of shielding gas controlled by the flow regulator deviates outside the range of suitable flow rates.

5. The system of claim 1, wherein the input comprises a purge gas flow rate for use when a welding arc is absent, the processor being configured to determine the desirable flow rate of the shielding gas based at least in part on the purge gas flow rate, and the flow regulator being configured to control the flow of shielding gas when the welding arc is absent to obtain the desirable flow rate.

6. The system of claim 1, wherein the user interface is incorporated onto a power source of the welding device, or is capable of being attached to, and/or detached from, a power source of the welding device.

7. The system of claim 1, wherein the processor is configured to determine the desirable flow rate prior to initiation of the flow of the shielding gas.

8. The system of claim 1, wherein the input comprises a first input, and the user interface is configured to display the second flow rate in response to a second input received by the user interface.

9. The system of claim 5, wherein the desirable flow rate comprises a desirable purge flow rate, the processor being configured to determine a desirable normal flow rate of the shielding gas for use when the welding arc is present, and the flow regulator being configured to control the flow of shielding gas when the welding arc is present to obtain the desirable normal flow rate.

10. The system of claim 1, wherein the flow regulator adjusts to pressure fluctuations in order to substantially maintain the desirable flow rate.

11. The system of claim 1, wherein the flow regulator comprises a proportional valve or a servo valve.

12. The system of claim 8, wherein the processor is configured to determine the second rate based on the first rate and a unit conversion algorithm.

13. A system for obtaining a desirable flow of shielding gas in a welding device, the system comprising:
a user interface having a plurality of welding parameter options, the user interface configured to receive an input from a user, the input comprising a nozzle size;
a processor configured to determine a desirable flow rate of the shielding gas based on the nozzle size and a Reynolds number; and
a flow regulator configured to control a flow of the shielding gas in order to obtain the desirable flow rate.

14. The system of claim 13, wherein:
the input comprises a first input and a second input,
the processor is configured to determine the Reynolds number based on the first input and the second input, and
the second input comprises: an air current condition in a vicinity of a weld operation, an amperage of a welding power source providing power for the weld operation, and/or an intended travel speed of a welding device performing the weld operation.

15. The system of claim 14, wherein the processor is further configured to determine the desirable flow rate of the shielding gas based on a dynamic viscosity of the shielding gas, a density of the shielding gas, and/or a hydraulic diameter of the nozzle determined by the processor in response to the nozzle size.

16. A method for obtaining a desirable flow of a shielding gas in a welding device, the method comprising:
prompting a user, via an output of a user interface, to provide an input to the user interface, the input comprising a purge gas flow rate for use when a welding arc is absent;
determining a desirable purge flow rate for the shielding gas based, at least in part, on the input; and
controlling a flow rate of the shielding gas when the welding arc is absent, via a flow regulator, to obtain the desirable purge flow rate.

17. The method of claim 16, further comprising determining a desirable normal flow rate for the shielding gas for use when the welding arc is present; and controlling the flow rate of the shielding gas when the welding arc is present, via the flow regulator, to obtain the desirable normal flow rate.

18. The method of claim 16, wherein the user interface is incorporated on to, or attachable to, a power source of the welding device.

19. The method of claim 16, further comprising displaying the flow rate of the shielding gas via the user interface.

* * * * *